United States Patent
O'Donnell et al.

(10) Patent No.: US 12,477,994 B2
(45) Date of Patent: Nov. 25, 2025

(54) UNLOAD SPOUT FOR AGRICULTURAL VEHICLE

(71) Applicant: CNH Industrial America LLC, New Holland, PA (US)

(72) Inventors: Shaun O'Donnell, Quarryville, PA (US); Denver Yoder, Manheim, PA (US); James Seedorf, Lancaster, PA (US); Ashutosh Tamrakar, Conshohocken, PA (US)

(73) Assignee: CNH Industrial America LLC, New Holland, PA (US)

( * ) Notice: Subject to any disclaimer, the term of this patent is extended or adjusted under 35 U.S.C. 154(b) by 396 days.

(21) Appl. No.: 18/221,981

(22) Filed: Jul. 14, 2023

(65) Prior Publication Data
US 2025/0017146 A1    Jan. 16, 2025

(51) Int. Cl.
*A01D 41/12*    (2006.01)
*A01D 90/10*    (2006.01)
*A01D 90/12*    (2006.01)

(52) U.S. Cl.
CPC ............. *A01D 90/12* (2013.01); *A01D 90/10* (2013.01)

(58) Field of Classification Search
CPC ........ A01D 90/12; A01D 90/10; A01D 90/14; A01D 41/1217; A01D 41/1226
See application file for complete search history.

(56) References Cited

U.S. PATENT DOCUMENTS

| | | | | |
|---|---|---|---|---|
| 5,546,738 | A | * | 8/1996 | Turner .................. A01G 20/43 56/16.6 |
| 7,644,816 | B2 | | 1/2010 | Veiga Leal et al. |
| 8,366,372 | B2 | | 2/2013 | Yoder et al. |
| 9,468,145 | B2 | * | 10/2016 | Coppinger .............. F16J 15/02 |
| 9,604,785 | B1 | | 3/2017 | Gaerke |
| 9,686,907 | B2 | | 6/2017 | Hui et al. |
| 10,806,077 | B2 | * | 10/2020 | Natarajan ............... A01F 12/44 |
| 2006/0016164 | A1 | * | 1/2006 | Debruycker ....... A01D 41/1217 56/14.6 |
| 2018/0352748 | A1 | * | 12/2018 | Rittershofer ............ A01F 12/40 |

FOREIGN PATENT DOCUMENTS

| | | | | |
|---|---|---|---|---|
| EP | 4491007 | A1 | * 1/2025 | ............ A01D 90/10 |
| JP | 2004147617 | A | 5/2004 | |
| WO | 9948352 | A1 | 9/1999 | |

OTHER PUBLICATIONS

The Extended European Search Report issued Dec. 4, 2024, by the European Patent Office in corresponding European Patent Application No. 24188434.5-1004. (8 pages).

* cited by examiner

*Primary Examiner* — Monica L Perry
(74) *Attorney, Agent, or Firm* — Buchanan Ingersoll & Rooney PC (57) ABSTRACT

An unload spout for an agricultural vehicle includes a hollow body having an inlet end for receiving crop material, an outlet end through which the crop material is distributed, and a side wall extending between the inlet end and the outlet end. A plurality of steps are formed on an interior facing side of the side wall for enhancing the structural integrity of the unload spout.

15 Claims, 8 Drawing Sheets

UNLOAD SPOUT FOR AGRICULTURAL VEHICLE

BACKGROUND OF THE INVENTION

1. Field of the Invention

The present disclosure relates to an unload spout for use with an agricultural vehicle, such as a combine harvester.

2. Description of the Related Art

An unload spout of an agricultural vehicle, such as a combine harvester, is used to control the flow of grain out of a tube and into a grain storage or transport container. To maintain control of grain flow, the spout should hold its shape. As the latest clean grain unload systems have increased in capacity, it would be desirable to optimize the rigidity, stiffness and weight of the unload spout in order to maintain the desired clean grain flow characteristics and capacity through the unload spout.

SUMMARY OF THE INVENTION

According to one aspect, an unload spout for an agricultural vehicle includes a hollow body having an inlet end for receiving crop material, an outlet end through which the crop material is distributed, and a side wall extending between the inlet end and the outlet end. A plurality of steps are formed on an interior facing side of the side wall for enhancing the structural integrity of the unload spout.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
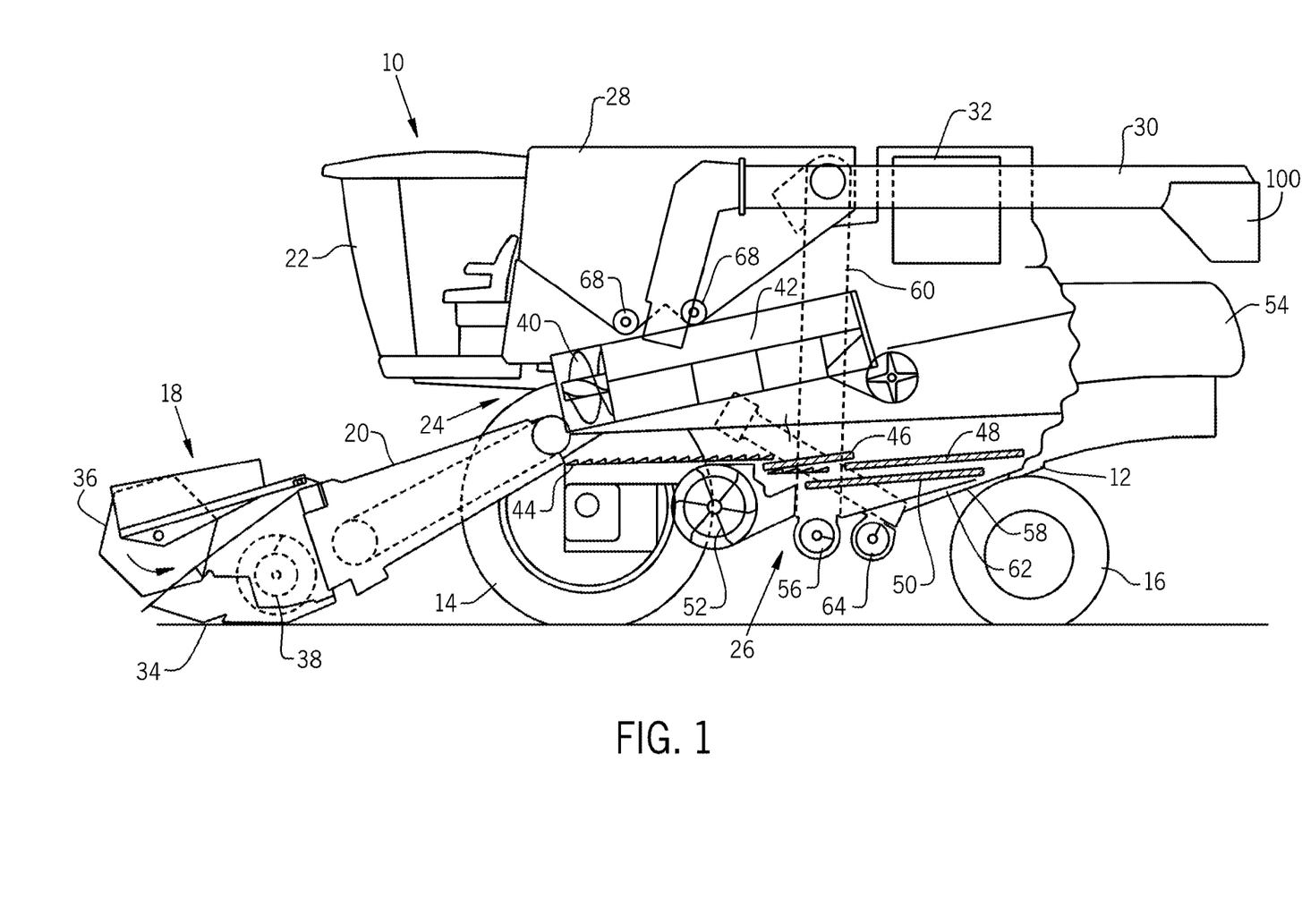
FIG. 1 is a side cutaway view of an embodiment of an agricultural harvester in the form of a combine, which is shown schematically.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading conveyor 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50) (also known as a cleaning sieve), and a cleaning fan 52. The upper sieve 48 and lower sieve 50 can be carried within a common framework. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading conveyor 30 for discharge from combine 10.

Figure 2:
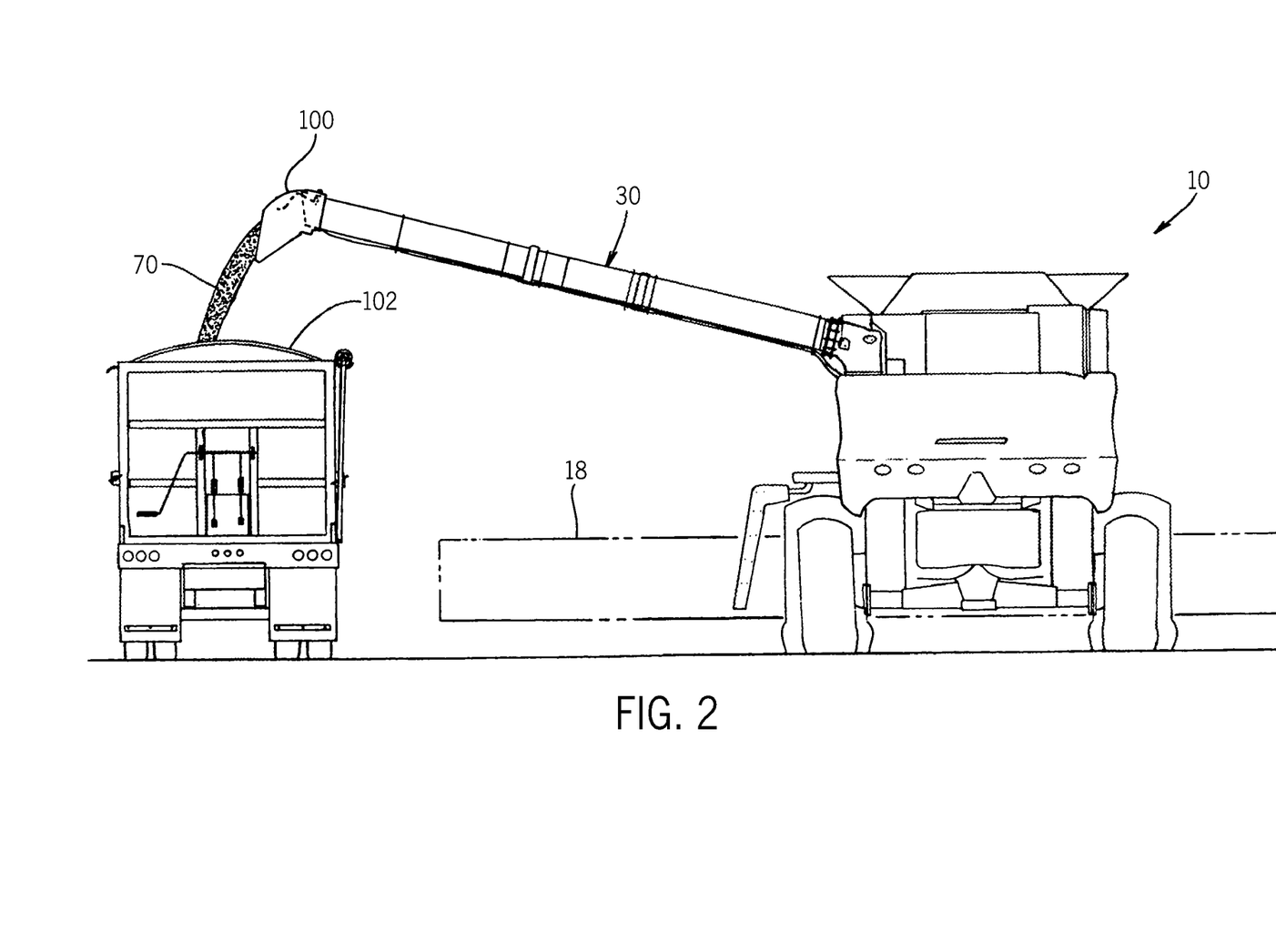
FIG. 2 is a rear end view of the combine of FIG. 1 showing grain unloading from an unloading conveyor of the combine into a truck.

FIG. 2 is a rear end view of the combine 10 of FIG. 1 showing grain unloading from unloading conveyor 30 of combine 10 into a truck 102. Unloading conveyor 30 is shown transversely extending and deployed outwardly in an unloading position as it unloads grain 70 through an unload spout 100 into grain truck 102. This unloading operation can occur as combine 10 and truck 102 are moving, which is referred to as unloading "on the go", or the unloading operation can occur in a stationary manner. At the end of the unloading operation, unloading conveyor 30 will be pivoted to a rearwardly directed transport position, extending along the adjacent side of combine 10. It can be noted here, that truck 102 is located a substantial distance to the side of combine 10, which is desired to avoid the possibility of contact with header 18 mounted on the front of combine 10, particularly when unloading on the go. It should also be noted that conveyor 30, when in the unloading position illustrated, will typically be tilted up toward the outer end thereof, at a greater angle, compared to when in the transport position, as additional height is often required to clear the top of the grain receptacle, here illustrated by truck 102.

Figure 3:
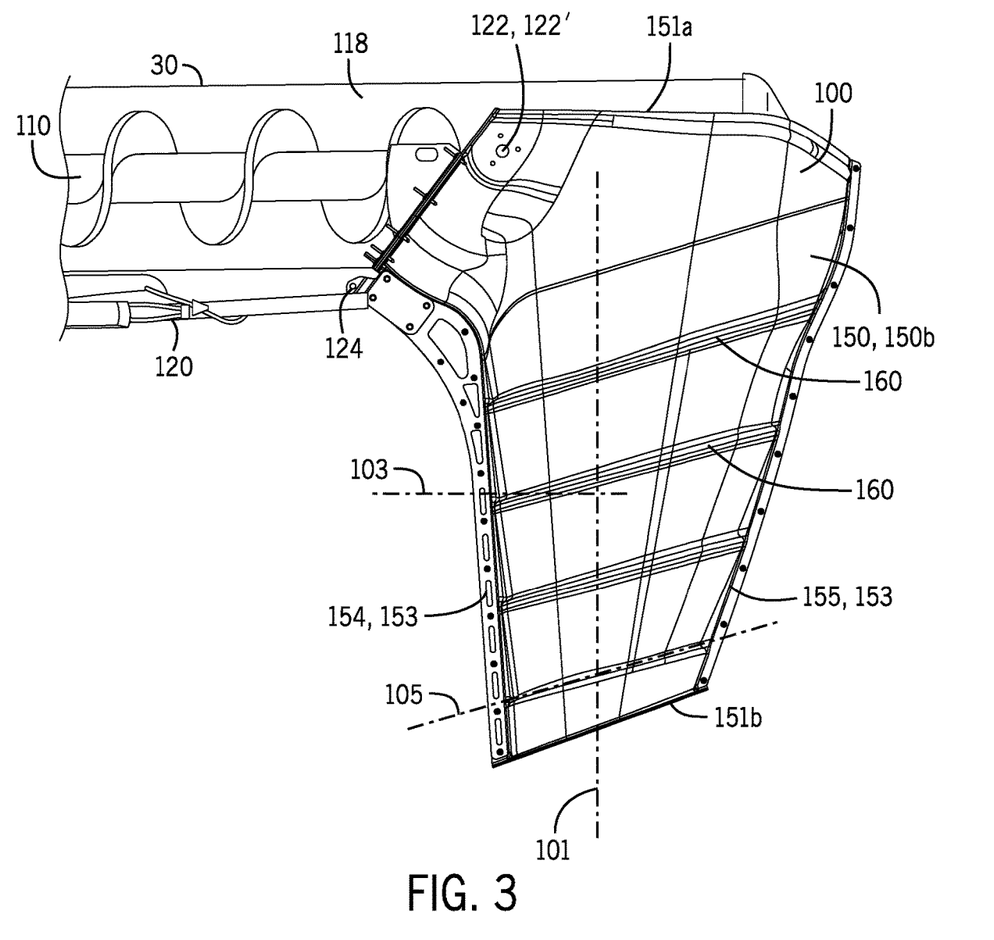
FIG. 3 depicts a view of an end portion of the unloading conveyor of the combine of FIG. 1, wherein the unload conveyor is shown partially cut-away to reveal an auger.

FIG. 3 depicts a view of the unloading conveyor 30 of the combine 10 of FIG. 1, wherein the unload conveyor 30 is shown partially cut-away to reveal an auger 110 of the unloading conveyor 30. Auger 110 is positioned and concealed within the interior of a cylindrical outer tube 118 (shown cutaway). Unload spout 100 is pivotably mounted to outer tube 118 by a fastener, pin or other pivot device 122, which defines a pivot point 122' for spout 100. An actuator 120 is connected to (i) a fixed point (not shown) on either outer tube 118 or another stationary surface, and (ii) a mounting point 124 on spout 100. Actuator 120 includes a piston and cylinder arrangement, whereby the piston is configured to extend from the cylinder to pivot spout 100 about pivot point 122".

In operation, auger 110 rotates to move the clean grain through the tube 118 of conveyor 30 toward unload spout 100. And, actuator 120 is operated to pivot spout 100 to a desired position for discharging clean grain from conveyor 30. Although spout 100 is a pivoting spout, it should be understood that spout 100 may be fixed, non-pivotable and locked in position. Thus, actuator 120 is an optional component.

Figure 8:
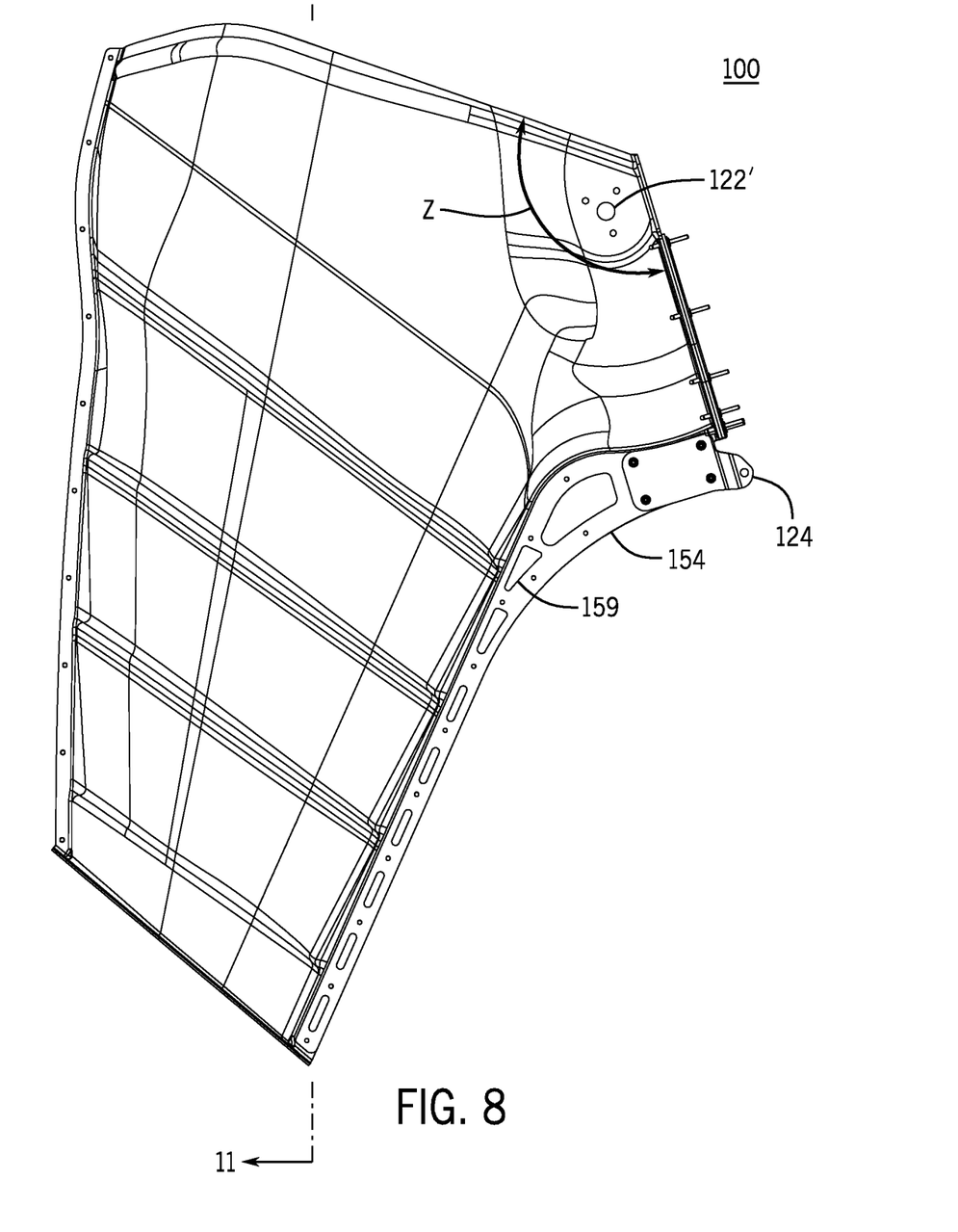
Figure 9:
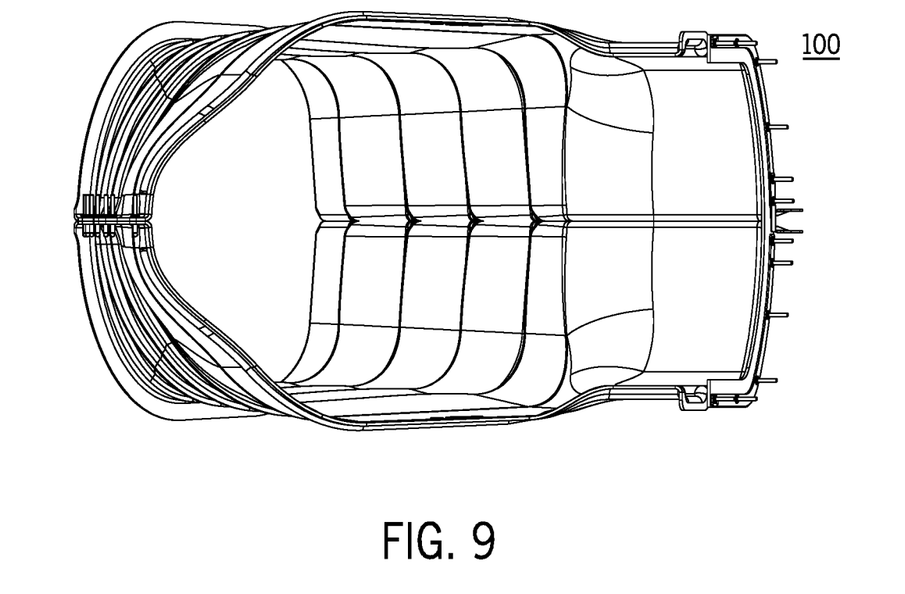
Figure 10:
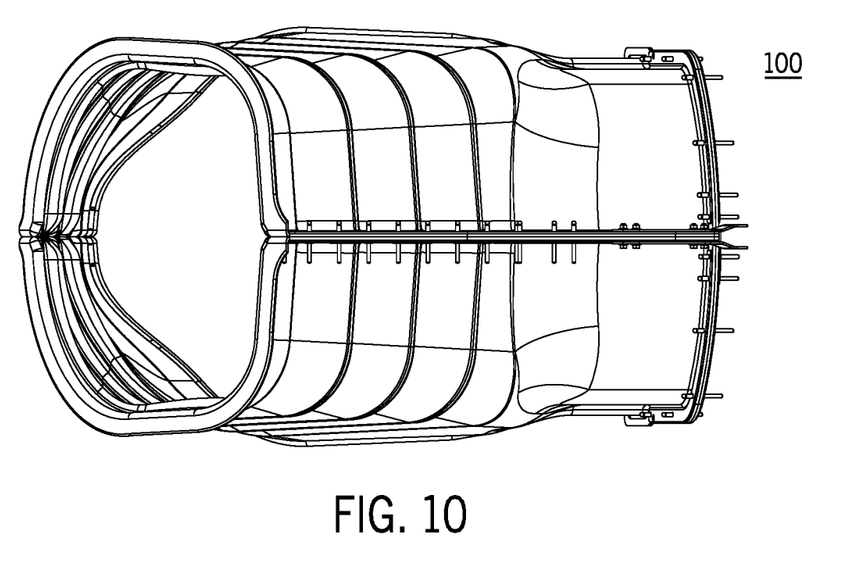

FIGS. 4-10 provide additional views of unload spout 100. Turning now to the finer details of spout 100, spout 100 comprises a hollow body 150 formed from two symmetrical halves 150a and 150b. Body 150 includes an open top end 151a (i.e., inlet end) and an open bottom end 151b (i.e., outlet end). Halves 150a and 150b are mated together at a front facing flange 154 and a rear facing flange 155. Each flange 154, 155 extends at or near the entire length of body 150 along axis 101. Mounting point 124 is disposed on the top end of flange 154. A series of fasteners 156 are mounted along the length of each flange 154, 155 to fix the halves 150a and 150b together. Mated flanges 154, 155 together form vertical (or substantially vertical) ribs that enhance the stiffness and structural integrity of spout 100. Flanges 154, 155 project outwardly from body 150 (i.e., away from the axis 101). The protruding length of flange 154 is greatest at or near mounting point 124. As best shown in FIG. 8, a series of openings 159 are disposed through flange 154.

Figures 4, 5:
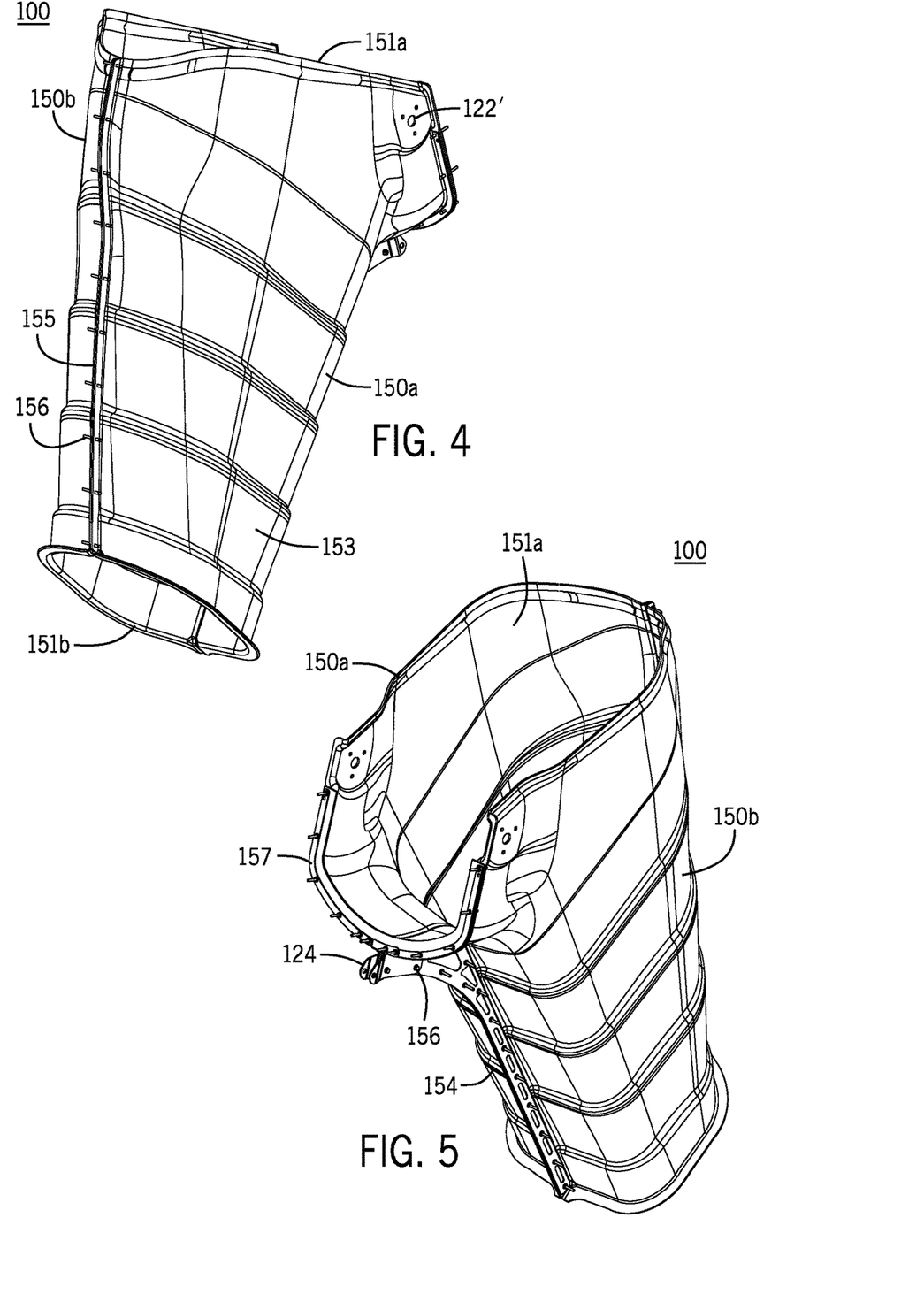
FIGS. 4-5 depict isometric views of the unload spout of the unloading conveyor of FIG. 3.
Figure 6:
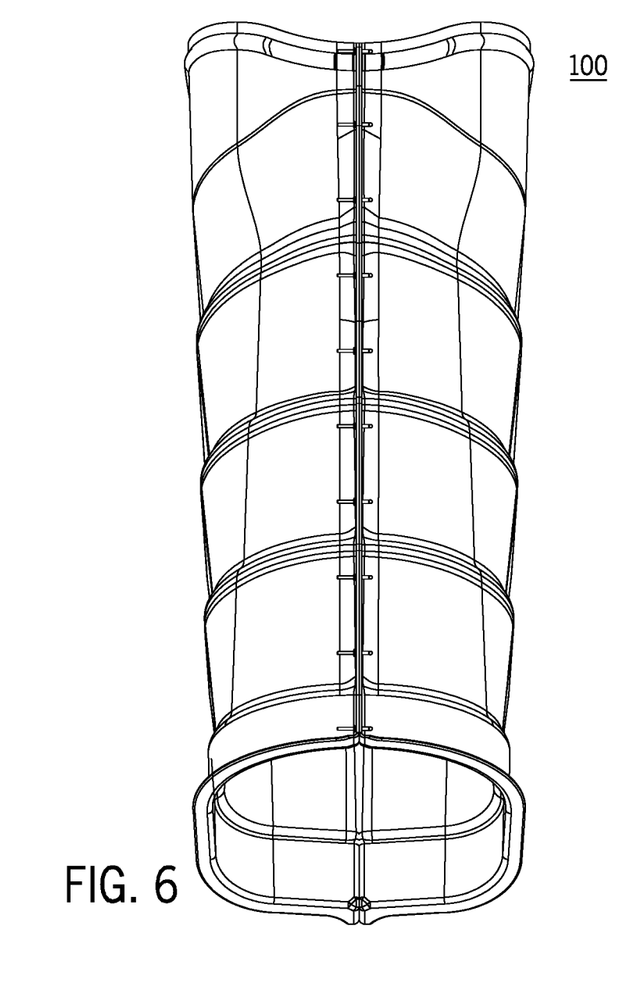
FIGS. 6-10 depict front, rear, side, top and bottom views of the unload spout.
Figure 7:
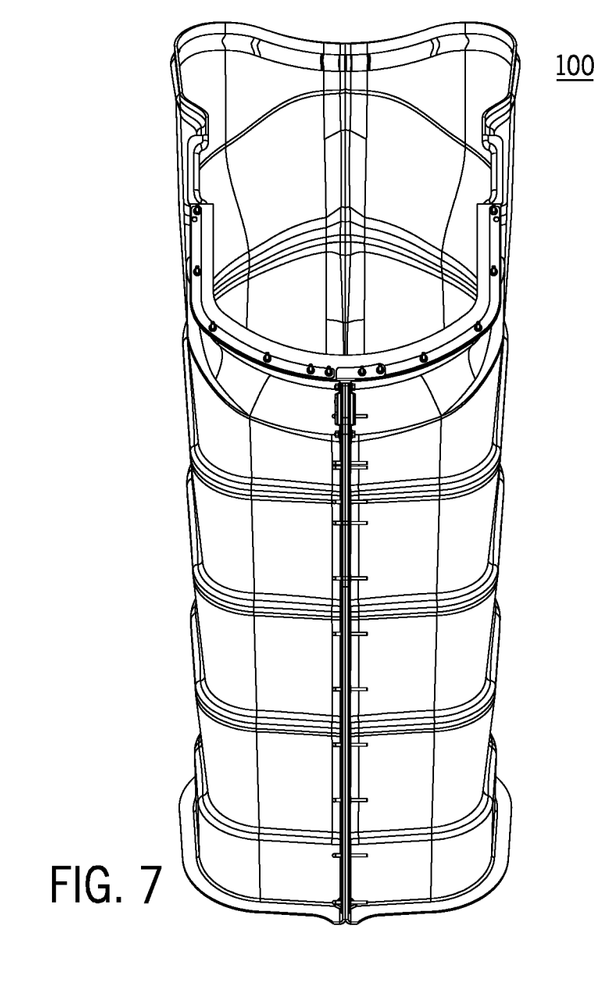

The top end surface 151a of body 150 includes a front-facing angled portion (or surface) 157 (FIG. 5). Portion 157 includes a flange for receiving fasteners such that portion 157 may be mounted to another component. Top end surface 151a extends along two different planes that are spaced apart by an obtuse angle Z (FIG. 8). Pivot point 122' is disposed adjacent to the intersection between those two planes.

As best shown in FIG. 3, the cross-sectional hollow area of body 150 progressively decreases from top end 151a to bottom end 151b. The perimeter of top end 151a is greater than that of bottom end 151b. Body 150 may be described as having a D-shape as viewed in cross-section (along axis 103). As seen in FIG. 3, the front wall of body 150 (by flange 154) forms an acute angle with longitudinal axis 101, and the rear wall of body (by flange 155) forms a larger acute angle with longitudinal axis 101. Alternatively, the front wall of body 150 may be vertical or substantially vertical (+/−5 degrees) and parallel (or nearly parallel) to axis 101. The front and rear walls of body 150 each approach axis 101 as viewed in the downward direction toward bottom end surface 151b. Bottom end surface 151b also forms an acute angle relative to axis 101. In contrast, top end 151a (not considering angled portion 157) is substantially orthogonal to axis 101. Angled portion 157 forms an acute angle with axis 101.

Figure 11:
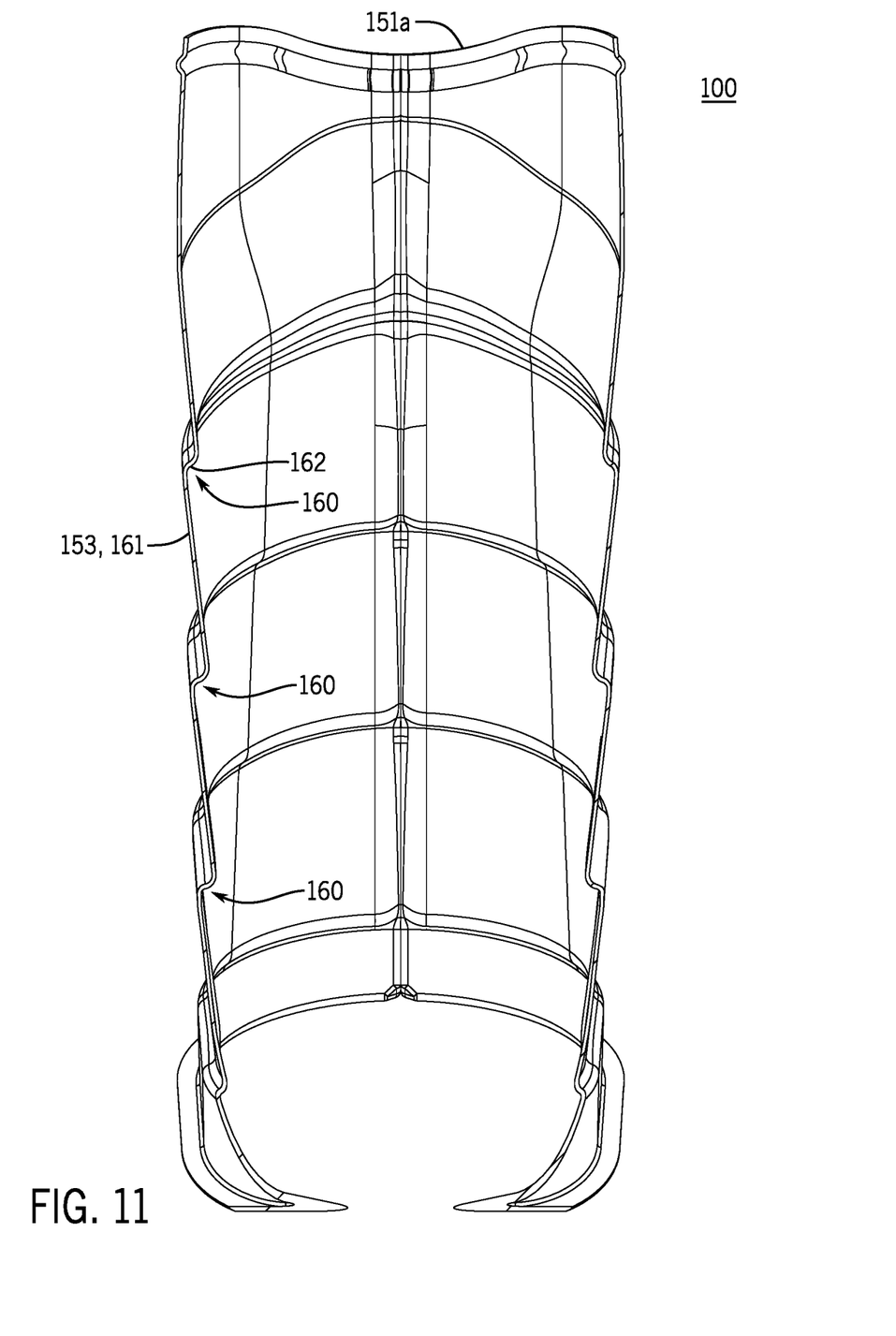
FIG. 11 is a cross-sectional view of the unload spout of FIG. 8 taken along the lines 11-11.

Turning now to FIGS. 3 and 11, a series of steps 160 are formed on the interior surface of the side wall 153 of body 150. Steps 160 may also be referred to as fall steps or inverted steps. The interior surface of body 150 may be described as stepped, undulating, curved, zig zag, corrugated, wavy, non-planar, or non-smooth, for example. The steps 160, like the flanges, enhance the stiffness and structural integrity of spout 100. Each step 160 extends about the entire inner perimeter of the body, with the possible exception of the areas at flanges 154, 155. The steps 160 are spaced apart along the length dimension (i.e., along axis 101), and may extend from the top end 151a to the bottom end 151b. According to one example, the steps 160 may extend at least 25% of the length dimension, or more preferably at least 50% of the length dimension, or even more preferably at least 75% of the length dimension. The steps 160 may be spaced apart along axis 101 either uniformly (as shown) or non-uniformly. As shown in FIG. 3, each step 160 extends along a plane 105 that is oriented at an acute angle relative to a horizontal axis 103 (the axis 103 being orthogonal to longitudinal axis 101). The steps 160 are also oriented in the same direction relative to axis 103 as outlet end 151b.

Each step 160 includes an elongated lengthwise portion 161 forming the side wall 153, and a horizontally-oriented landing 162 depending from the lengthwise portion 161. Each landing 162 extends along a respective plane 105. Lengthwise portion 161 faces and forms an acute angle with axis 101 whereas landing 162 faces the bottom end 151b and forms an acute angle with horizontal axis 103. Landing 162 is oriented substantially perpendicular to lengthwise portion 161. Due to the effects of gravity, the clean grain does not accumulate on the landings 162 of the steps.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An unload spout for an agricultural vehicle, said unload spout comprising:
   a hollow body comprising an inlet end for receiving crop material, an outlet end through which the crop material is distributed, and a side wall extending between the inlet end and the outlet end,
   a plurality of steps, each step extending along an interior facing side of the side wall.

2. The unload spout of claim 1, wherein each step includes a lengthwise portion extending between the inlet and outlet ends, and a stepped portion depending from the lengthwise portion that faces the outlet end, wherein the stepped portion is inverted such that the crop material is either limited or prevented from accumulating on the stepped portion.

3. The unload spout of claim 1, wherein each step includes one of a rounded edge or a sharp edge.

4. The unload spout of claim 1, wherein the steps extend more than 50 percent of a length dimension of the hollow body.

5. The unload spout of claim 1, wherein the steps are spaced apart along a longitudinal axis of the hollow body.

6. The unload spout of claim 1, wherein a perimeter of the inlet end is greater than a perimeter of the outlet end, wherein each perimeter is measured along a plane that is normal to a direction of the grain passing through the spout.

7. The unload spout of claim 1, wherein the hollow body comprises a two-piece body having symmetrical half portions.

8. The unload spout of claim 7, wherein each symmetrical half portion includes an outwardly extending flange portion, and wherein the outwardly extending flange portions of the flanges are fastened together to form the hollow body.

9. The unload spout of claim 8, further comprising a mounting point disposed on the flanges that is configured to be coupled to an actuator for pivoting the unload spout.

10. The unload spout of claim 1, wherein the steps are arranged uniformly along a longitudinal axis of the body.

11. The unload spout of claim 1, wherein each step is defined along a plane that is oriented at an acute angle with respect to a horizontal axis, and wherein the horizontal axis is oriented orthogonal to a longitudinal axis of the body.

12. An unloading conveyor comprising an outer tube, the unload spout of claim 1 mounted to an end of the outer tube, and an auger positioned within the outer tube for transporting the crop material toward the inlet end of the unload spout.

13. The unloading conveyor of claim 12, wherein the unload spout is pivotably connected to the outer tube.

14. An agricultural vehicle comprising the unloading conveyor of claim 12.

15. The agricultural vehicle of claim 14, wherein the agricultural vehicle is a combine harvester.

* * * * *